United States Patent
Wyss

[11] Patent Number: 6,020,737
[45] Date of Patent: *Feb. 1, 2000

[54] SHAFT POSITION DETECTORS WITH STRAY MAGNETIC FIELD COMPENSATION

[76] Inventor: Walter Wyss, Humrigenstrasse 51, 8704 Herrliberg, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/884,130

[22] Filed: Jun. 27, 1997

Related U.S. Application Data

[63] Continuation-in-part of application No. 07/949,235, May 19, 1992, abandoned.

[51] Int. Cl.[7] .............................. G01B 7/30; H02K 24/00
[52] U.S. Cl. .............. 324/207.25; 324/225; 324/207.18; 324/207.17; 318/661
[58] Field of Search .............................. 324/207.25, 225, 324/207.12, 207.15–207.19; 702/142, 145, 151; 318/661, 652–660

[56] References Cited

U.S. PATENT DOCUMENTS

| | | | |
|---|---|---|---|
| 4,150,314 | 4/1979 | Zabler et al. | 310/155 |
| 4,206,374 | 6/1980 | Goddijn | 310/112 |
| 4,814,704 | 3/1989 | Zerrien, Jr. et al. | 324/225 |
| 5,327,789 | 7/1994 | Nijdam | 324/207.25 |

*Primary Examiner*—Jay Patidar
*Attorney, Agent, or Firm*—Laurence R. Brown

[57] ABSTRACT

A rotary resolver having a stator housing with electromagnetic coils and a permanent magnetic rotor rotatable therein is improved to provide a resolver system with more precise angular rotor position readings. Interacting system features include a ring of soft magnetic material interposed between north and south magnetic pole structure on the rotor, which is enhanced in performance by a particular one of the soft magnetic materials RSi 24, RNi 8 and RNi 5. Adjustable compensation coil structure in the stator housing interacting with the rotor flux pattern obtains more precise angular readings in different working locations. A digital control system dynamically processes flux compensation information. Resolver units may be positioned at an end of a rotating shaft in a working position for detecting the angular rotation position of the shaft.

14 Claims, 5 Drawing Sheets

SHAFT POSITION DETECTORS WITH STRAY MAGNETIC FIELD COMPENSATION

This is a continuation-in-part of U.S. Ser. No. 07/949,235 filed May 19, 1992, now abondoned.

FIELD OF THE INVENTION

The present invention relates to a resolver to measure or determine angle positions or revolutions of a shaft by using an inductive magnetic field between a stator and a rotor connected or connectable to said shaft. Such a resolver has been disclosed in the international application WO 92/16994 which is hereby incorporated by reference.

BACKGROUND OF THE INVENTION

In principle, such devices consist of sensors which measure angles or revolutions by using the inductance principle. With existing devices the needed induction coils are installed in the stator and rotor or, as low cost and mass production resolvers in the stator only. In the last-mentioned known device, which is the subject of WO 92/16994, the stator is only provided with an induction and a measurement coil whereas the rotor is equipped on its circumference with a number of pole surfaces of differing polarity which will interact with said stator coils, whereby the pole surfaces are formed in such a way as to present in each angle position of the rotor a reluctance which is specific for this position.

In a further and preferred embodiment of the last-mentioned resolver, the pole surfaces of the rotor, seen over the whole circumference, are continuously changing such that the air gap between the pole surface and the corresponding stator part will continuously differ in each angle position (continuous change).

Although this known resolver has rather low production costs, the accuracy of the determined angle positions of the rotor or the revolutions of the shaft is, in many applications, not precise enough.

SUMMARY OF THE INVENTION

It is an object of the present invention to build a resolver which has a high precision and which allows versatility of the models to be produced.

In order to solve this problem the resolver in accordance with the invention is characterized in that the magnetic material used is a so-called soft magnetic material, i.e. RSi 24, RNi 8 or RNi 5 (DIN 17 405).

In a further embodiment of the present invention a compensation coil is provided in order to compensate any stray magnetic fields resulting from the induction coil and/or from the measurement coil. The compensation coil is located at the measurement coil in order to maximally couple magnetic flux of the measurement coil. To determine and to adjust the current through the compensation coils, corresponding means are provided.

In another embodiment of the present invention the means to determine and adjust the current through the compensation coil consist of a digital control unit having conversion and calculation capabilities.

In yet another embodiment of the present invention said means to determine and adjust the current through the compensation coil consist of a digital control unit, having calculation and interface capabilities, and a conversion unit.

In yet another embodiment of the present invention instead of the digital control unit a manually adjustable trimmer is used as means to determine and adjust the current through the compensation coil.

In yet another embodiment of the present invention at least one compensation transformer having an adjustable core is provided to adjust any offset voltage on the voltage across the at least one measurement coil, whereas the primary winding of said compensation transformer is connected in serial with the induction coil and whereas the secondary winding of said compensation coil is connected in serial with the respective measurement coil.

In a further embodiment of the present invention two measurement coils are provided whereas said measurement coils have orthogonal orientation.

BRIEF DESCRIPTION OF THE DRAWINGS

In the following, the invention will be further described by means of embodiments shown in the drawings, in which.

Figure 1:
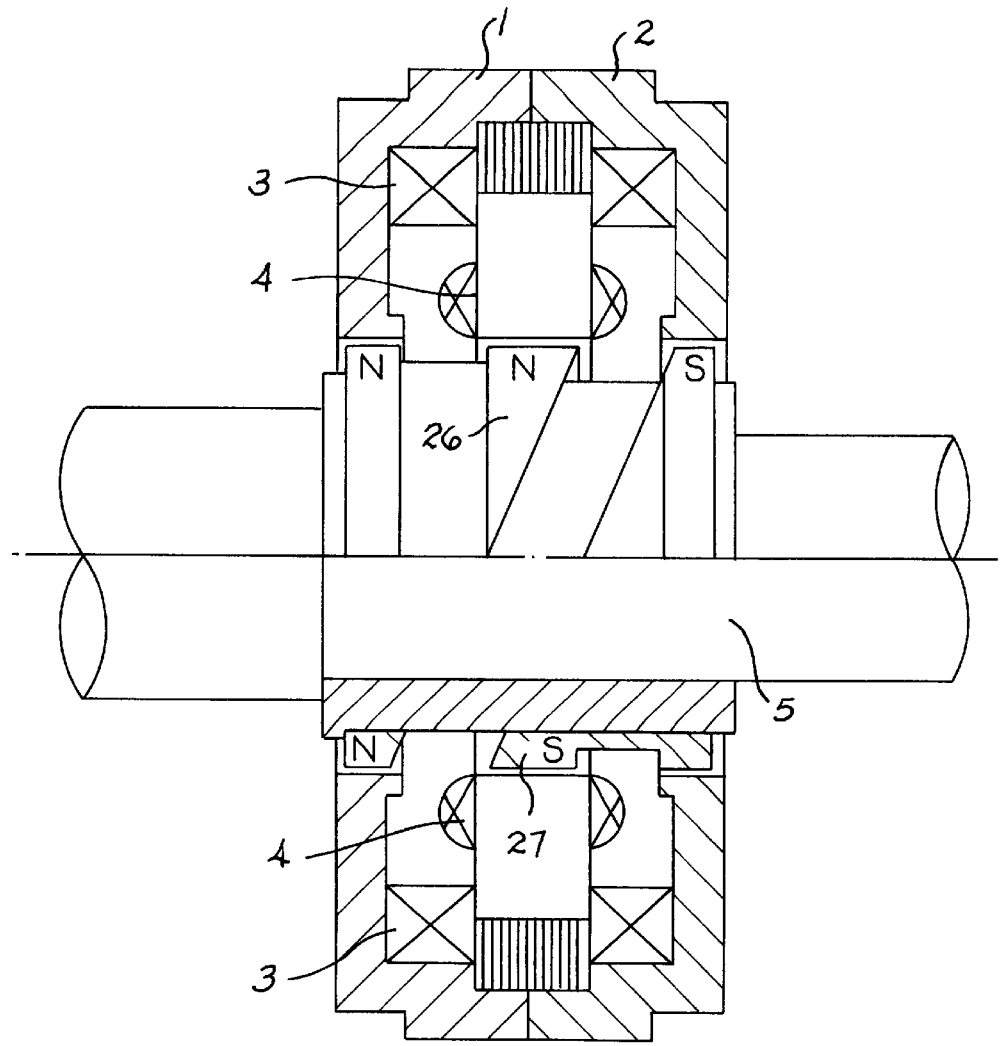
FIG. 1 the principle construction of a resolver, partially in sections.

A resolver, schematically shown in FIG. 1, consists of a stator 1 and 2 in which is mounted the induction coil 3 and the measurement coil 4. The rotor 5 does not carry any coil and is arranged in an axial through-passage of the stator 1, 2. On the circumference of the operative part of the rotor are provided protuberances representing pole surfaces N and S of differing magnetic polarity. According to the invention a soft magnetic material is used in the resolver whereas the term soft magnetic material the following is understood: RSi 24, RNi 8 or RNi 5 whereas short names according to DIN 17 405 (German Industrial Standard) have been used ("Hyperm—Weichmagnetische Werkstoffe und Bauteile", Widia Magnetechnik, 1995).

Figure 2:
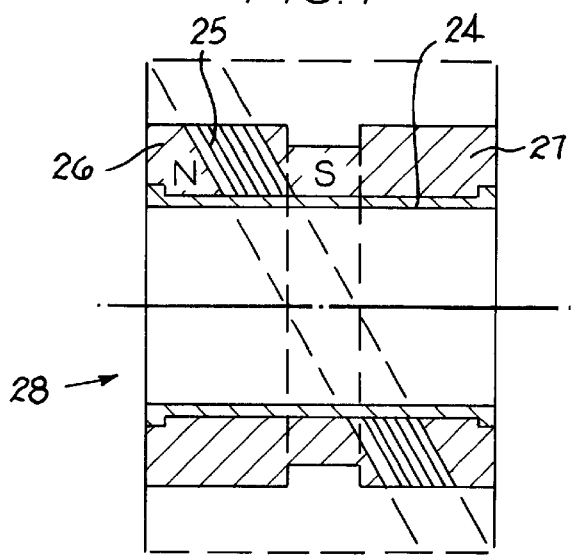
FIG. 2 a preferred embodiment of the rotor, in section, of a resolver.
Figure 3:
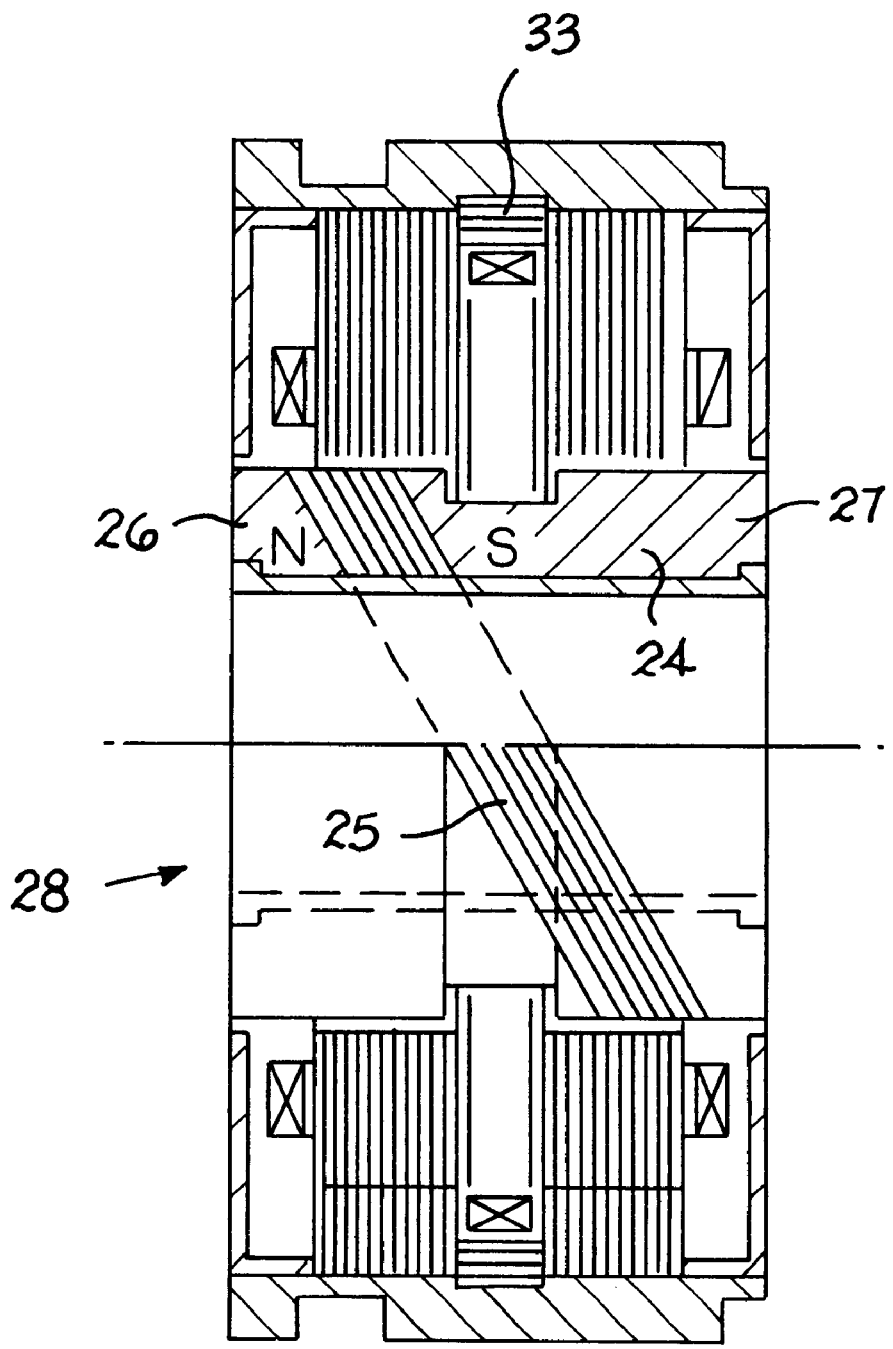
FIG. 3 a section of a resolver equipped with a rotor according to FIG. 2.

FIGS. 2 and 3 represent a further variant of a rotor 28 (FIG. 2) or a resolver equipped therewith (FIG. 3).

In this variant the rotor is of simple construction and easy to produce: The rotor 28 consists of an inner cylindrical sleeve 24 made from non-magnetic material having arranged on its outer surface a magnet ring 25 consisting of soft magnetic material as defined above. This magnet ring 25 is parallel to a plane inclined with respect to the rotor axis. The magnet ring 25 is held in place on both sides by cylindrical rings 26 and 27 the end surfaces of which are held by flanged parts of the inner sleeve (with all components pressed together).

The inner end surfaces of ring 26 and 27 also made of non-magnetic materials are also inclined and parallel to said plane, so as to enclose the magnet ring 25 between the rings 26 and 27.

If the resolver (FIG. 3) is provided with a magnet yoke 33, less magnetic disturbances of the coils are produced which leads to an increased accuracy of measurements.

Figure 4:
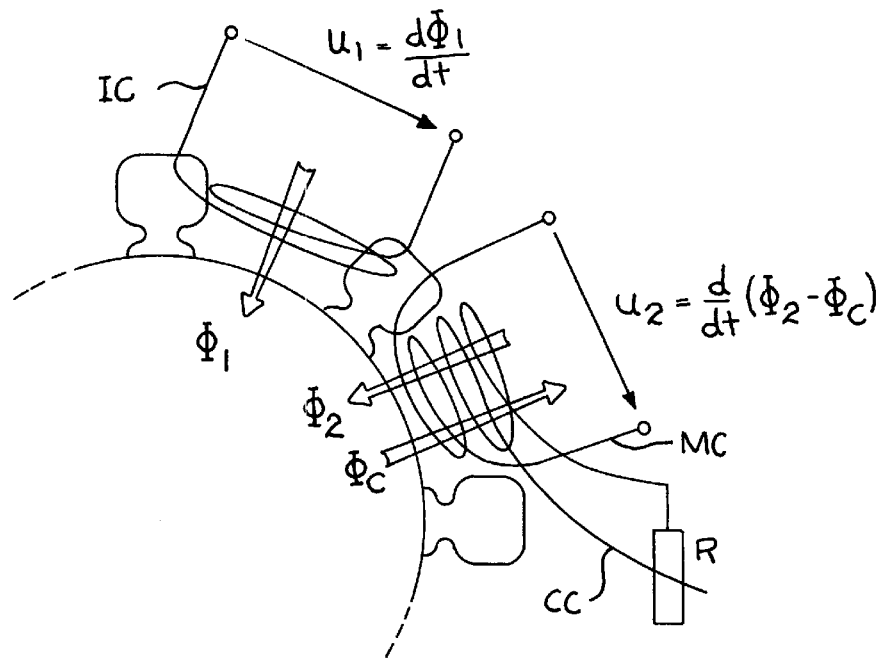
FIG. 4 a principle arrangement of an induction coil, a measurement coil and a compensation coil.

The accuracy is, according to the invention, further increased by providing a compensation coil to compensate stray magnetic fields resulting from the induction coil and/or from the measurement coil. Such an arrangement is schematically illustrated in FIG. 4. The compensation coil CC is arranged in such a manner that the measurement coil MC and the compensation coil CC are maximally coupled. Through this coupling of the two coils the relation for the voltage $U_2$ across the measurement coil MC is equal to:

$$u_2 = \frac{d}{dt}(\Phi_2 - \Phi_c)$$

whereas the symbols $\Phi_1$, $\Phi_2$ is used for a corresponding magnetic flux. Similarly the voltage across the measurement coil $\Phi_1 = d\Phi_1$.

To adjust the compensation flux $\Phi_c$, adjusting means are provided as, for example, the one represented in FIG. 4: A trimmer R can be manually adjusted by way of experience or by way of comparing the obtained resolver results to measurement results by an adjusting device.

During operation of the resolver the flux $\Phi_2$ induces a voltage across the compensation coil CC and therefore also across the trimmer R which, in turn, limits the current through the compensation coil CC which current produces the compensation flux $\Phi_c$. If the windings of the compensation coil CC have opposite orientation compared to the windings of the measurement coil MC, the corresponding flux $\Phi_c$ and $\Phi_2$, respectively, are subtracted according to the above-mentioned formula, i.e. some of the magnetic flux through the measurement coil is compensated.

Figure 5:
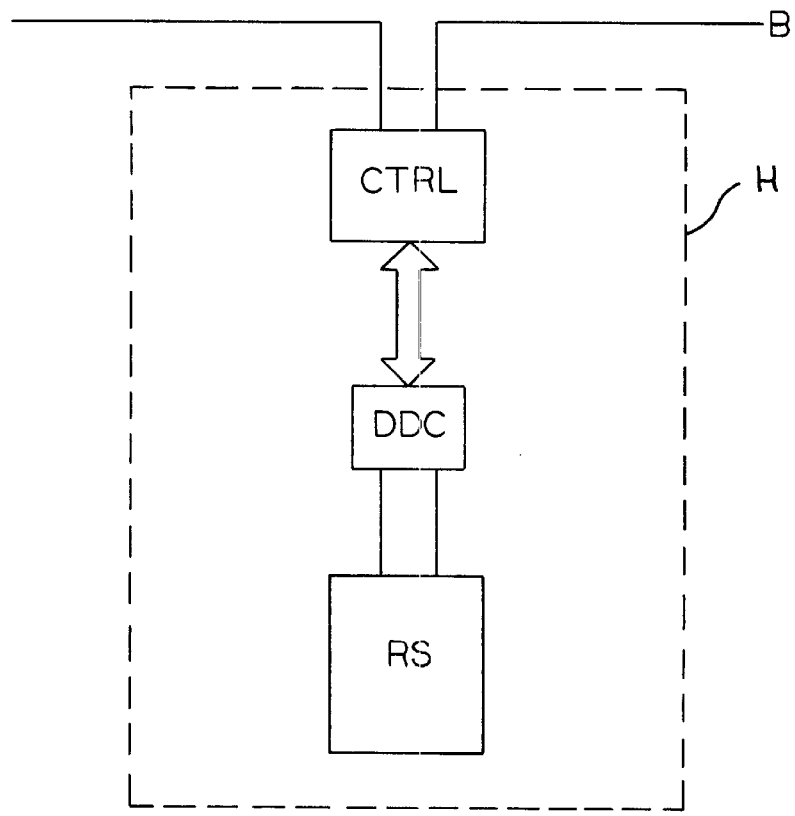
FIG. 5 schematically, a circuit arrangement built into a resolver housing.

In a further embodiment of the present invention a digital control unit CTRL (FIG. 5) is used instead of the adjustable trimmer R (FIG. 4). Along with the digital control unit CTRL a conversion unit DDC, if it is not already included in the digital control unit CTRL, is used to convert analog signals to digital signals and vice versa. As shown in FIG. 5, the digital control unit CTRL is connected to a bus B, e.g. a bus using the CAN-protocol, through which the resolver can be managed by a central processing unit (not shown in FIG. 5) and/or through which the measured signals can be transmitted.

If the used digital control unit has no interface unit incorporated, a separate interface unit is provided which is operationally connected to the digital control unit CTRL, on the one hand, and to the bus system, on the other hand.

In a preferred embodiment the digital control unit CTRL is a SAE 81C90 component (stand alone full CAN controller) made by SIEMENS and the conversion unit DDC is a 16 bit monolithic tracking resolver of RDC-19220 series of ILC Data Device Corporation.

Figure 7:
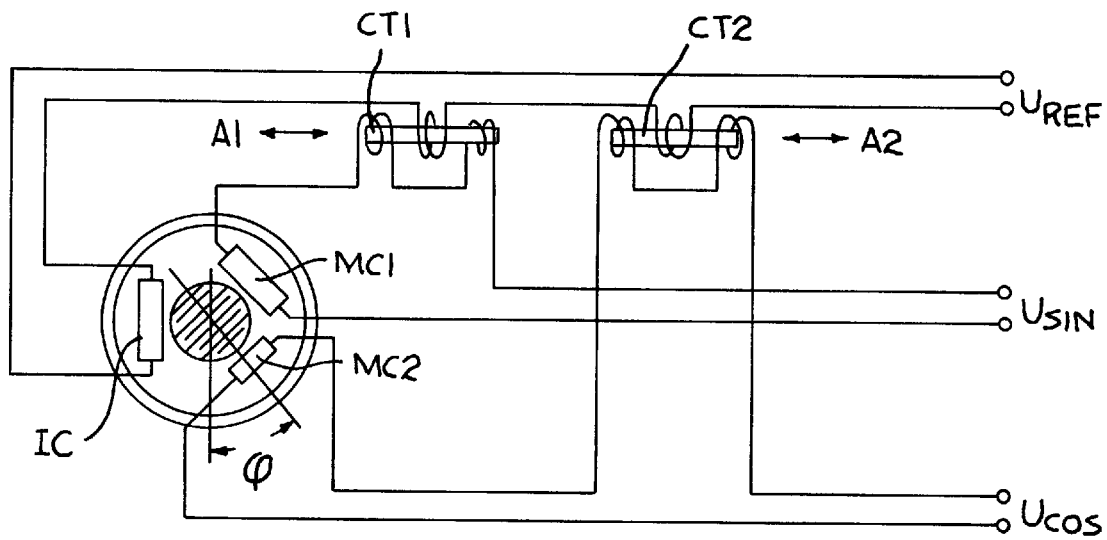
FIG. 7 a further embodiment of the present invention comprising two compensation transformers.

As shown in FIG. 5 the resolver RS, which has been described by way of example along with FIGS. 1 to 4, the digital control unit CTRL and the conversion unit DDC are incorporated in a housing H which can be easily installed as a whole at all necessary locations whereas the installed housings H, i.e. the resolvers, can easily be connected through the bus B such as to terminals $U_{REF}$ (FIG. 7). This simple installation is especially important in automotive systems where a large amount of information must be collected and processed in a central processing unit.

Figure 6:
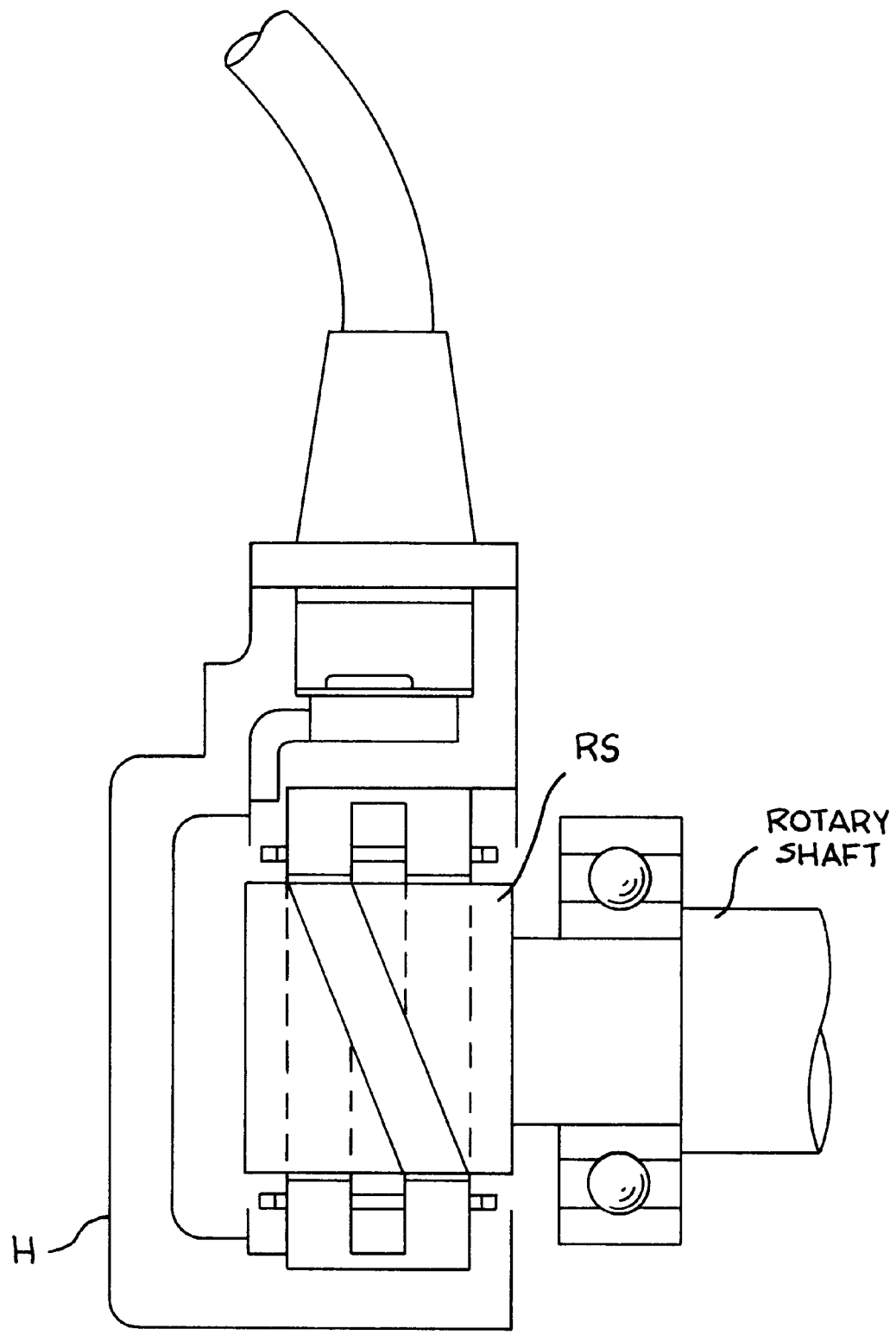
FIG. 6 a preferred construction of the resolver housing according to FIG. 5.

In FIG. 6 a preferred embodiment of the housing H (FIG. 5) is represented in which all necessary components are incorporated. It is seen that the housing unit of FIG. 6 encompasses the end of the rotary shaft.

In FIG. 7 a further embodiment of the present invention is represented comprising two measurement coils MC1 and MC2 each having a compensation transformer CT1 and CT2, respectively, to adjust $U_{SIN}$ and $D_{COS}$ a possible offset voltage $\Delta U$ ($U_{REF}$, FIG. 8) across the respective measurement coil MC1, MC2. Whereas the primary windings of the compensation transformers CT1 and CT2, respectively, are connected in serial to the induction coil IC, the secondary windings of the compensation transformers CT1 and CT2, respectively, are connected in serial with the respective measurement coil MC1 or MC2. By moving the core of the respective compensation transformer CT1, CT2 (in direction of the arrows A1 and A2 in FIG. 7) the offset voltage across the respective measurement coil MC1 or MC2 can be adjusted.

Figure 8:
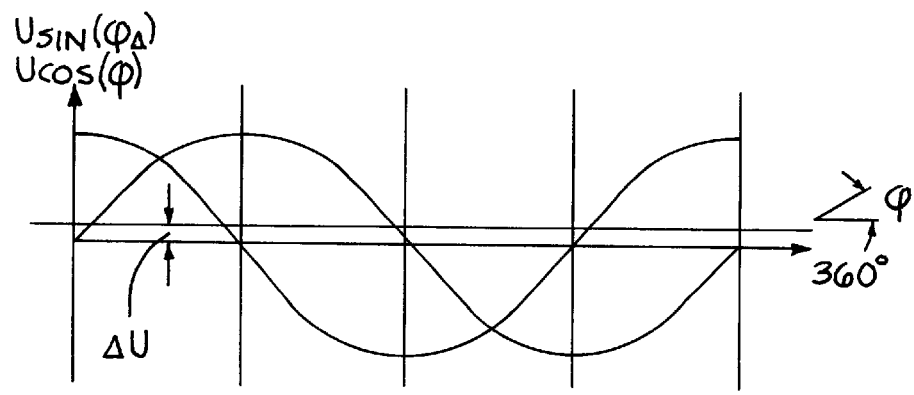
FIG. 8 a possible timing diagram of the measured voltages in the embodiment according to FIG. 7.

In FIG. 8 a possible time diagram is represented to illustrate the compensation of the offset voltage $\Delta U$.

I claim:

1. A resolver for measuring and detection of angular positions and revolutions of a shaft, using an induced magnetic field between a stator having stator windings and a rotor for determining position of said shaft and together forming part of the resolver, said stator windings comprising an induction coil and at least one measurement coil, the rotor being provided with circumferential permanent magnetic North pole and South pole surfaces which interact with the stator windings to induce voltage, the pole surfaces being designed in such a manner that a magnetic flux develops induced voltages for identifying each angular position of the rotor, wherein a soft magnetic material configuration disposed between the North pole and South pole surfaces for defining a specific magnetic flux distribution pattern is positioned on the rotor, and said soft magnetic material consists of one of the following materials: RSi 24, RNi 8 or RNi 5, a compensation coil provided to compensate a stray magnetic field resulting from the induction coil and/or from the measurement coil which would reduce the accuracy of determining the resolver shaft position, said compensation coil being located at the measurement coil to maximally couple magnetic flux, and means to determine and adjust current through the compensation coil.

2. The resolver according to claim 1 whereas said means to determine and adjust the current through the compensation coil consist of digital control means for conversion and calculation, which digital control means is connected to the compensation coil and to the measurement coil.

3. The resolver according to claim 2 whereas said means to determine and adjust the current through the compensation coil consist of digital control means for calculation and interfacing, and a conversion unit coupling the digital control means to said resolver to communicate with said measurement coil and said compensation coil.

4. The resolver according to claim 2 whereas said means to determine and adjust the current through the compensation coil consist of an adjustable trimmer connected to the compensation coil which windings have opposite orientation compared to the windings of the measurement coil.

5. The resolver according to claim 1 comprising at least one compensation transformer having an adjustable core to adjust any offset voltage on the voltage across the at least one measurement coil, whereas the primary winding of said compensation transformer is connected in serial with the induction coil and whereas the secondary winding of said compensation coil is connected in serial with the respective measurement coil.

6. The resolver of claim 1 wherein the rotor rotates about a rotational axis and the soft magnetic material comprises a magnetic ring disposed between said permanent magnet North and South poles and is inclined at an angle with said rotational axis of the rotor.

7. A resolver system having a resolver with an easy to manufacture permanent magnetic rotor structure for obtaining more precise angular readings of a rotor position said rotor structure having permanent magnet elements patterned for producing electromagnetic flux interacting with electromagnetic measurement coils in an encompassing stator housing in which the rotor rotates, comprising in combination:

a ring of soft magnetic material interposed between north and south permanent magnetic pole structure in the rotor for inducing upon rotor rotation a defined electromagnetic rotor flux pattern for interacting with the electromagnetic measurement coils in the stator housing, and compensation coil structure in the stator housing magnetically coupled to interact with said rotor flux pattern and further having adjusting means for adjusting magnetic flux coupling with said measurement coils in said stator housing to obtain said more precise angular readings.

8. The resolver system of claim 7 further comprising said soft magnetic material consisting of a single one of the magnetic materials RSi 24, RNi 8 and RNi 5.

9. The resolver system of claim 7 wherein said adjusting means further comprises current limiting trimmer means connected to said compensation coil structure.

10. The resolver system of claim 7 wherein said adjusting means comprises means for inducing magnetic flux arranged for subtracting from magnetic flux of the measurement coil.

11. The resolver system of claim 7 wherein said adjusting means comprises a digital control unit with accompanying analog to digital signal conversion means, said digital control unit being coupled to said resolver for processing information afforded by said compensation coil structure.

12. The resolver system of claim 11 wherein said digital control unit is housed as a unit with the rotor and stator housing for positioning at an end of a rotating shaft to thereby determine its precise angular rotational position.

13. The resolver system of claim 7 wherein:

said measurement coils further comprise a set of three measurement coils arranged in a pattern with the coils being concentrically positioned about said rotor, and wherein said adjusting means comprises said compensating coil structure which further comprise two compensating coil arrays each with a winding connected respectively in series with two of said three measurement coils, and a separate coil on each of the two compensating coil arrays connected in series with the third of said set of three measurement coils.

14. A resolver system for obtaining precise angular readings of a rotatable shaft; comprising in combination, a resolver housing unit for indicating shaft position comprising a rotor member with permanent magnet pole structure separated by a soft iron member defining a gap between north and south magnetic poles in said permanent magnet pole structure for producing a source of electromagnetic flux indicative of the angular position of said rotor member and a stator housing having electromagnetic coil structure for measurement of the angular rotor position, said housing unit being configured to mount on an end of a rotatable shaft to measure its angular position, a set of compensation coil windings positioned in said stator housing for offsetting stray magnetic fields about the electromagnetic coil structure, and a digital control unit in said housing unit for adjusting the magnetic field configuration to decrease angular rotor position measurement errors due to stray magnetic fields in the vicinity of the electromagnetic coil structure.

* * * * *